UNITED STATES PATENT OFFICE.

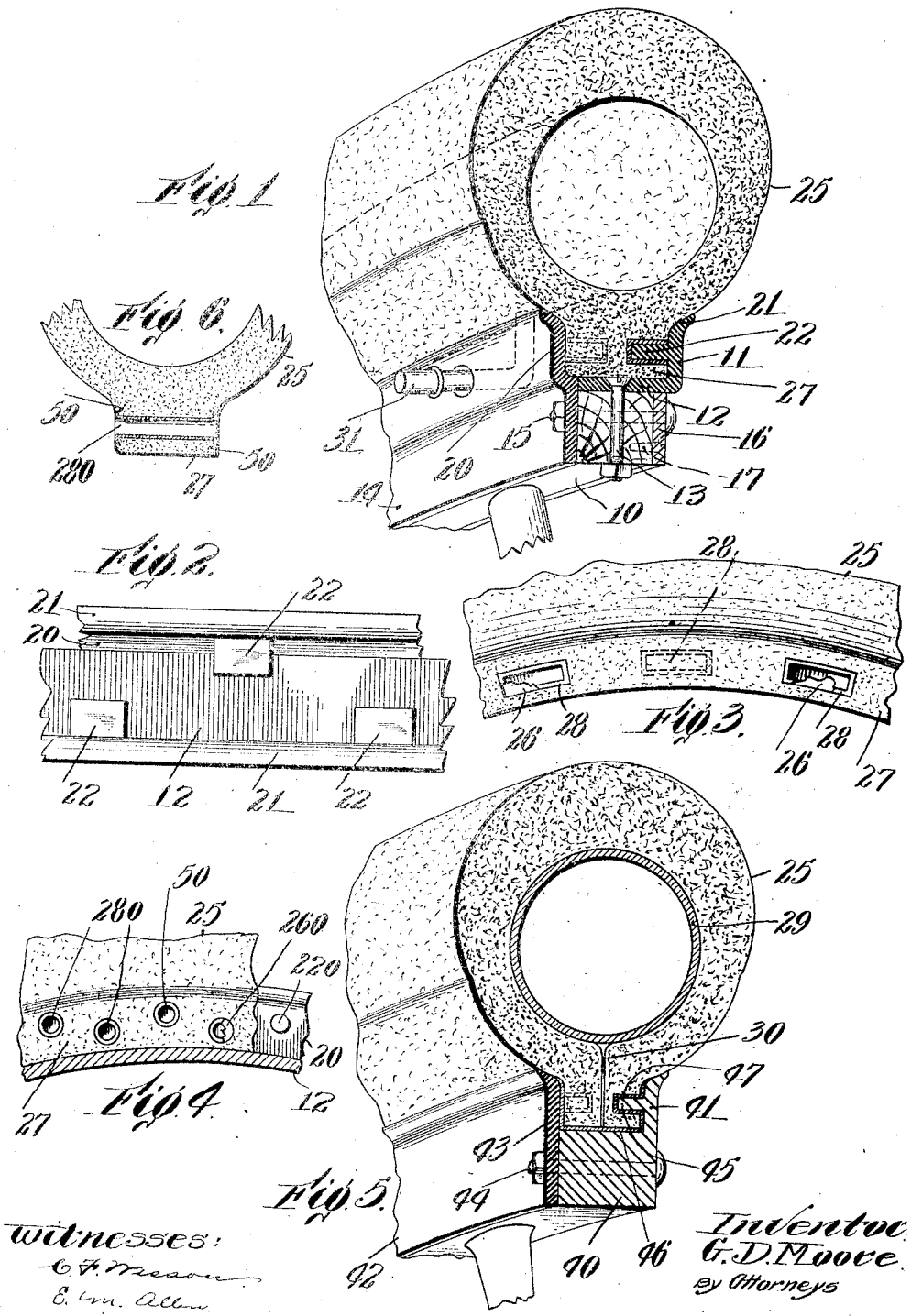

GEORGE D. MOORE, OF WORCESTER, MASSACHUSETTS.

WHEEL AND TIRE THEREFOR.

961,882. Specification of Letters Patent. Patented June 21, 1910.

Application filed November 15, 1907. Serial No. 402,229.

*To all whom it may concern:*

Be it known that I, GEORGE D. MOORE, a citizen of the United States, residing at Worcester, in the county of Worcester and State of Massachusetts, have invented a new and useful Wheel and Tire Therefor, of which the following is a specification.

This invention relates to a tire or shoe for automobiles and similar vehicles and to a new and improved means for applying the same to a wheel.

The principal objects of the invention are to provide a construction which can be used with a form of tire of such a nature that no inner tube will be required; to provide means whereby a new tire previously inflated can be carried on the machine and put in position in a very convenient manner when desired, thus saving the time required in pumping up the tire after it is in place; to provide for putting the tire in position in a rapid manner; to provide improved means for securing the tire whether of single or double tube type to the wheel; and generally to improve the construction and means for attachment of tires and shoes of the general character referred to.

Reference is to be had to the accompanying drawings which show preferred forms of the invention and in which, Figure 1 is a sectional perspective view of a portion of a tire and fastening arrangement as applied to a wooden felly. Fig. 2 is a plan of the attaching devices with the tire removed. Fig. 3 is a fragmentary side elevation of the tire itself. Fig. 4 is a similar view showing a modification. Fig. 5 is a view similar to Fig. 1 showing certain modifications and especially adapted for use on all-metal wheels, and Fig. 6 is a section of another modification.

Referring first to the first three figures, it will be seen that the invention is shown as applied to a wheel having a wooden felly 10. This felly is provided with a flange 11 at one side thereof which in this instance preferably is formed on a rim 12 surrounding the felly and secured thereto by a series of bolts 13 or in any desired manner. This flange 11 is shown in Fig. 1 as extending outwardly from the surface of the felly beyond the edge thereof. On the opposite side of the felly a removable plate or ring 14 is secured by means of bolts 15 or the like. The heads of the bolts all bear against a plate or plates 16 on the other side of the felly, this plate being shown as all in one piece so as to constitute a ring although it performs the office of a plurality of washers. In order to keep the plate in position when the bolts are removed, it is held on the felly by means of screws 17 or the like.

The removable plate or ring 14 is provided with a flange 20 similar to the flange 11 and located exactly opposite it. In the form shown in Fig. 1, this flange is offset from the main portion of the plate 15 so as to provide a wide space between the flanges for the tire. Both of these flanges preferably are provided with outwardly flaring edges 21 and with wide projections 22. These projections extend from each flange toward the other a considerable distance, preferably about one-third of the way across the space between the flanges. Preferably they are located alternately as indicated in Fig. 2 and are of sufficient width and length so that they furnish wide surfaces for engagement with the tire to prevent the tire from being torn away from its support. On account of the broad bearing surfaces of these projections or lugs, the tire is securely held so as to prevent any creeping of the tire around the rim and the lugs or projections are of such strength as to avoid all danger of any breakage from this cause. The broad bearing surfaces are either flat in the form shown in Fig. 2 or curved as in the form indicated at 220 in Fig. 4, for example.

In the preferred form of the invention, the tire 25 is provided with a corresponding series of cavities or depressions 26 or 260 formed in the opposite sides of an inwardly projecting extension 27 which fits within the space between the flanges 11 and 20 both of which are shown off-set from the side of the felly. These depressions 26 or 260 obviously are located alternately on the two sides of the flange when the projections or lugs 22 or 220 are alternate, and being permanently formed in the tire when the same is made, the projections fit them when the tire is put in place in such a way that creeping or any other disarrangement of the tire is effectually prevented. This is considered as an important improvement over those constructions in which sharp pointed pins are formed on the tire holding rim to puncture the rubber and hold the tire. In these constructions the creeping of the tire is not effectually prevented as on account of their sharp points and edges the pins will cut the rubber instead of preventing motion thereof. In the present construction, the broad surfaces which are presented to resist motion of the tire in all directions relative to the rim, effectually accomplish the desired result. It is preferred also to line the depressions or cavities with sheet metal linings 28 or 280. These can be placed in the cavities before the final vulcanization and secured thereto during that process or may be secured by being flanged over in the ordinary way so as to be clenched into the rubber as indicated at 50 in Fig. 6. They afford additional means for preventing any rupture of the tire at this point and hold the same in position. On account of the use of these metal linings, the number of lugs or depressions can be made comparatively small although in Fig. 2, they are shown as about six inches apart around the circumference of the wheel. The linings can be omitted however, or they can extend all the way through the extension 27 as indicated in Fig. 6.

Although the tire can be made in the usual way as indicated in Fig. 5 with the inner tube 29, the device can be constructed so that no inner tube will be required. For this purpose the outer tube or shoe is first made in the usual way with the depressions or cavities, and sheet metal linings if desired, and then it is put in the mold after the entire structure is completed and the edges corresponding to the edges 30 shown in Fig. 5, placed in contact with each other, with a rubber cement between them if necessary, and sealed by vulcanization so that the structure then constitutes a single tube tire which can be inflated in the usual way through a valve 31.

The tire can be provided with any desired kind of armor or protecting devices but these are not shown as they constitute no part of the present invention. By constructing a tire in this way, the expense for the inner tubes is saved and there will be no necessity of watching the inner tube to see that it does not get pinched between the edges 30 while pumping it up or attaching the bolts. Furthermore, the tire can be carried on the machine in an inflated condition and no pumping up, with the corresponding waste of time, will be required when a new tire is put on.

In attaching the inflated tube, the plate 14 is first removed, leaving the plate 16 and bolts 15 in position, the old tire is then drawn off sidewise and the new inflated tire slipped on the rim 12 in proper position so that the projections 22 on the flange 11 will enter the depressions 26 on that side of the tire. The only other operation necessary is to apply the plate or ring 14 and tighten up the nuts on the bolts 15. In this way the tire is effectually clenched between the flanges 11 and 20, which clenching action is assisted by the lugs, which hold the tire in position to prevent it from creeping or otherwise working loose.

It will, of course, be understood that this invention is capable of being carried out in many ways other than that illustrated in Fig. 1. One of these other forms is indicated in Fig. 5 in which a wheel is represented having a metallic felly 40 provided with an integral flange 41 and a removable plate 42 on the other side having a flange 43 thereon, opposite the flange 41. The plate 42 is held in position by bolts 44 and the flanges 41 and 43 are provided with projections or lugs 45 which can be of the same shape and size as those shown in the other figures. In this case a double tube tire is shown having an inner tube 29 and the inwardly projecting extension of the shoe is provided with a sheet metal casing 46 which is provided with off-sets which constitute linings 47 fitting in the depressions in the tire. These modifications come within the scope of this invention.

I am aware that the invention can be carried out in many other forms without departing from the scope thereof as expressed in the claims. Therefore, I do not wish to be limited to the particular constructions shown, but What I do claim is:—

1. The combination of a wheel, and a felly having a flange extending outwardly from one side of the felly parallel to the plane of the wheel, with a removable plate on the felly opposite said flange, said plate and flange having wide-faced projections on their inner faces extending transverse to the plane of the wheel, and a tire provided with an extension in the plane of the wheel having permanent molded cavities or depressions on opposite sides thereof for receiving said projections.

2. In a tire holding device for a wheel, the combination of two clencher flanges each having wide-faced projections arranged on the inner face thereof and extending toward the other flange, a tire having an inwardly projecting extension fitting between said two flanges and provided with permanent depressions or cavities registering with said projections.

3. The combination with a wheel having a felly, of a flange extending outwardly from the felly near one edge thereof and held rigidly thereon, a ring removably secured to the opposite side of said felly independently of said flange and having an off-set flange opposite the first named flange, wide-faced projections extending from the inner faces of said flanges, means on the felly opposite the removable flange for receiving the heads of bolts for securing the removable flange in position, and means projecting into the felly for holding the last named means on the felly.

4. In a tire holding device for a wheel, the combination of two clencher flanges each having wide-faced projections alternately arranged on the inside surfaces thereof, a tire clenched between said flanges and provided with alternately arranged depressions or cavities and registering with said projections, and sheet metal linings in said cavities.

5. A tire having a circular extension projecting toward the axis thereof and provided on its opposite sides with permanent molded depressions or cavities having wide faces, and provided with sheet metal linings therein.

6. A tire having an extension projecting toward the axis thereof and provided on its opposite sides with depressions or cavities having wide faces provided with sheet metal linings therein secured in the depressions or cavities by vulcanization.

7. A tire having a solid extension projecting toward the axis thereof, and having permanent depressions or cavities in its side surfaces.

8. A tire in the general form of an outer tube or shoe having two opposite extensions secured together to form a seal, and having permanent depressions or cavities in their opposite outer sides.

In testimony whereof I have hereunto set my hand, in the presence of two subscribing witnesses.

GEORGE D. MOORE.

Witnesses:
ALBERT E. FAY,
C. FORREST WESSON